US 011625844B2

(12) United States Patent
Calvin et al.

(10) Patent No.: US 11,625,844 B2
(45) Date of Patent: Apr. 11, 2023

(54) RAPID EFFECTIVE CASE DEPTH MEASUREMENT OF A METAL COMPONENT USING PHYSICAL SURFACE CONDITIONING

(71) Applicant: The Boeing Company, Chicago, IL (US)

(72) Inventors: Abraham Calvin, Havertown, PA (US); Marco P. Ciccone, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 16/871,517

(22) Filed: May 11, 2020

(65) Prior Publication Data
US 2021/0350557 A1 Nov. 11, 2021

(51) Int. Cl.
*G06T 7/521* (2017.01)
*G01B 11/22* (2006.01)

(52) U.S. Cl.
CPC ............. *G06T 7/521* (2017.01); *G01B 11/22* (2013.01); *G01B 2290/65* (2013.01)

(58) Field of Classification Search
None
See application file for complete search history.

(56) References Cited

U.S. PATENT DOCUMENTS

| 2013/0038322 A1* | 2/2013 | Yamamoto | G01N 27/80 |
| | | | 324/239 |
| 2015/0020926 A1* | 1/2015 | Iwamoto | C21D 6/002 |
| | | | 148/318 |
| 2018/0305561 A1* | 10/2018 | Stenson | B05D 7/14 |
| 2018/0347025 A1* | 12/2018 | Shiga | C21D 9/32 |
| 2019/0143482 A1* | 5/2019 | Iwata | B24C 1/10 |
| | | | 72/16.3 |
| 2019/0194793 A1* | 6/2019 | Rigo | C23C 8/34 |
| 2019/0277781 A1* | 9/2019 | Murakami | G01N 23/20008 |

FOREIGN PATENT DOCUMENTS

WO WO-2007062008 A2 * 5/2007 ............... F27B 5/04

OTHER PUBLICATIONS https://www.youtube.com/watch?v=t7c7zLgxIMk, Case depth using automatic measurement, accessed on May 11, 2020.
Dr.John Cammett, Shot Peening Coverage—The Real Deal, The Shot Peener Magazine, 2007, vol. 21, Issue 3.

* cited by examiner

*Primary Examiner* — Edemio Navas, Jr.
(74) *Attorney, Agent, or Firm* — Quinn IP Law (57) ABSTRACT

A method for determining an effective case depth of a metal component includes forming a conditioned core surface by blasting or shot peening an exposed surface of the metal component with blast media. The exposed surface is a contiguous exposed surface of the case and core. The method includes measuring surface texture, compressive stresses, or another suitable characteristic of the conditioned core surface using a surface metrology sensor, and identifying a case-core boundary using the measured characteristic, including identifying a location at which a predetermined difference or gradient in the characteristic is present within the exposed surface. The method also includes measuring the effective case depth as a perpendicular distance between a reference surface of the case and the case-core boundary.

20 Claims, 3 Drawing Sheets

_Fig-3_

_Fig-4_

Fig-5

RAPID EFFECTIVE CASE DEPTH MEASUREMENT OF A METAL COMPONENT USING PHYSICAL SURFACE CONDITIONING

BACKGROUND

Metal components are often subjected to sliding contact along critical working surfaces, which, over time, leads to component damage and failure. For this reason, it is beneficial to selectively harden the critical working surfaces. For example, interfacing surfaces of a rotary gear element or a rotary shaft may be selectively infused with an application-suitable element in order to create an end product having desirable mechanical properties. Such a process is referred to in the art as case hardening, with the hardened/infused layer(s) or case having increased surface hardness relative to uninfused areas of the component, i.e., the core, along with increased wear and fatigue resistance. The softer core material is better adapted to absorbing loads transmitted through the metal component, which in turn is essential to the metal component's performance and long-term durability. Similar beneficial effects may be gained by cladding compatible hard and soft alloys together as a composite metallic material.

Although case hardening process parameters are closely controlled and monitored during component fabrication, validation of the metal component's effective case depth is nonetheless required. Hardness inspection techniques are relatively straightforward when applied to accessible surfaces of a metal component. In aerospace, transportation, and other industries in which case hardening techniques are utilized, availability of surface hardness data alone is insufficient. As a result, precise and repeatable measurements of effective case depth, or a comparable depth of other mechanical property-enhancing surfaces or layers, typically requires the use of sacrificial test samples and the extensive use of time-consuming processing steps such as excision/cutting, mounting, and polishing of the test samples, subsequent hardness measurement, and data processing.

Indentation-based macro-hardness testing systems are typically used to measure the surface hardness of metal components. As hardness in general refers to resistance of a given metal component to plastic deformation under a rail braced load, such hardness testing systems operate by forcing an indenter constructed of a baseline hard material such as diamond or tungsten carbide into a test surface at a single/discrete location, under a specific load or set of loads, and thereafter measuring the depth of the indenter's penetration into the test surface. When evaluating effective case depth of a case-hardened layer, a series of micro-sized hardness indents are placed at specific distances from a surface of the component and measured. The resultant hardness profile is utilized to determine the effective case depth, i.e., the perpendicular distance from the surface of the hardened case to a point at which the hardness level equals a specified material/application-specific value. As will be appreciated, "effective case depth" differs from "total case depth", with the latter being the perpendicular distance from the surface of the case to a point at which differences in chemical or physical properties can no longer be distinguished in the microstructure of the metal component.

In contrast to macro-hardness testing, the hardness profiles may be generated using a micro-hardness testing system whose technological principles are nearly identical to the aforementioned macro-hardness testing system, except that instead of depth of penetration, the size and shape of the resultant indentation is measured using specialized software to yield a hardness value. When the surface geometry of the metal component is relatively elaborate, validation of effective case depth may be required at several discrete locations, resulting in hundreds or thousands of individual indentations possibly being required in order to validate the effective case depth in the required critical areas.

Due to the sensitivity of micro-hardness testing, small variability in testers or operators might affect the reported depths and hardness values, e.g., calibration blocks, indent spacing, microscope lighting, and location/orientation of traverse. Similarly, visual techniques used for providing a rough estimate of hardness depth tend to rely on surface etching, and thus chemical exposure of the test sample. This in turn introduces measurement variability due to factors such as etchant age, etching duration, and uniformity of microstructure of the tested surfaces.

SUMMARY

Methods and associated systems are disclosed herein for rapidly measuring the effective case depth or similar depth measurements of a metal component having a relatively hard layer positioned adjacent to a relatively soft layer. For descriptive consistency, the harder layer is referred to herein as a case and the softer layer is referred to as a core without limiting the present teachings specifically to case-hardened metals. That is, the present disclosure may also be applied to effective depth measurement of different layers of a metal component effectively altered by the use of cladding and/or other layered material builds, as well as to metal components having surfaces that are selectively hardened by heat treating or other processes.

The disclosed solutions may be used as integral parts of a quality inspection or quality assurance process in lieu of or in conjunction with conventional indentation-based hardness testing methods of the types generally described above. The proposed solutions enable a user to bypass some of the most time-consuming steps of conventional hardness testing processes in order to rapidly measure effective case depth across a much larger area. As a result, the extra time and variability commonly associated with indentation-based hardness testing strategies is vastly reduced.

Reliability of the present approach is based on an identifiable correlation between a hardness-related characteristic, such as but not limited to surface texture or internal stresses, and a corresponding surface hardness of a metal component. Thus, the method according to a disclosed embodiment proceeds by physically conditioning an exposed surface of the metal component to thereby create such a characteristic, with the term "physically conditioning" excluding the use of chemical etchants and other chemical surface treatment processes in favor of wider area controlled plastic deformation of the exposed surface in the disclosed embodiments.

Adequate physical surface conditioning falling within the scope of the present disclosure may be achieved by blasting or shot peening an exposed surface of the metal component with an application-suitable blasting media, e.g., spherical beads and/or asymmetrical pieces of glass, metal, or ceramic collectively having a well-defined media hardness level. Although each individual piece or bead of blast media that is used in a given lot of blast media will not necessarily have exactly the same hardness level, the media hardness level for a collective lot of bulk media material or shot falls within a defined hardness tolerance or maximum-minimum hardness range, with the media hardness level typically set by the manufacturer for a given lot. Accordingly, the media hardness level is a fixed parameter selectable as part of the disclosed method. After subjecting the exposed surface to physical surface conditioning, a surface metrology sensor is used to measure and quantify the resulting characteristic.

Using properly selected and applied control parameters as set forth herein, the uniform physical conditioning of the exposed surface, which includes exposed contiguous surfaces of the core and case, will result in little to no surface deformation of the exposed case surface. In contrast to the case surface, the exposed core surface will be altered in a measurable and quantifiable way to produce the conditioned core surface. A transition or boundary between the case and core, with such a boundary hereinafter referred to as the case-core boundary, can therefore be detected using a surface metrology sensor as part of the present method and thereafter used to measure the effective case depth.

The proposed solution may therefore employ use of a physical media blasting operation using well-defined parameters such as blast pressure, average and peak blast media hardness, media shape and size distribution, standoff distance, coverage rate, etc., all of which also help to ensure process repeatability. Likewise, the proposed solution better lends itself to evaluating larger, more complex samples and multiple test locations simultaneously relative to existing indentation-based micro-hardness testing systems.

According to an exemplary embodiment, a method for determining the effective case depth of a metal component includes physically conditioning an exposed surface of a metal component to thereby form a conditioned surface, including subjecting a contiguous area of a case and core of the metal component to a physical surface conditioning process. The conditioned surface includes a conditioned surface of the case and a conditioned surface of the core, with such surfaces being contiguous. The method according to this embodiment includes measuring a characteristic of the conditioned surface using a surface metrology sensor, and then locating a case-core boundary using the measured characteristic. Location of the case-core boundary includes identifying a location at which a predetermined difference or gradient in the measured characteristic indicative of the case-core boundary is present on the conditioned surface. The method also includes measuring the effective case depth as a perpendicular distance between a reference surface of the case and the case-core boundary.

Physical conditioning of the exposed surface may include blasting or shot peening the exposed surface using blast media. For instance, when the metal component is optionally constructed of carburized steel having a case hardness of about 50 HRC, e.g., 9310 steel, a hardness level of the blast media may be in a range of about 48 HRC to 52 HRC, and physically conditioning the exposed surface of the metal component may include blasting or shot peening the exposed surface from a standoff distance of about 6 inches, at a pressure of about 40 psig, and with a coverage level of about 200 percent.

The measured characteristic in some embodiments includes measured surface texture or roughness, with the surface metrology sensor including a profilometer in such embodiments. The profilometer may be configured as a non-contact profilometer such as a laser profilometer, a scanning interferometer, or a reflectometer. Other configurations of the metrology sensor include an X-ray diffractometer, with the measured characteristic being a level of internal compressive stresses.

The metal component could be representative of a build quantity or lot. In such an application, the method may optionally include comparing the measured effective case depth to a threshold effective case depth, e.g., from a blueprint of the metal component or another calibrated reference, and automatically executing a quality assurance and/or control action with respect to the build quantity or lot when the measured effective case depth is less than the threshold effective case depth.

Some embodiments of the method may include cutting the metal component to form the exposed surface, such that the exposed surface is a cross-sectional area of the metal component. In addition, the present disclosure might drive backward design changes that allow for cross sections of the contiguous area of the case and core to be visible, such as gear endfaces, allowing for effective case depth measurement without such cutting.

A system for determining effective case depth of a metal component is also disclosed. One embodiment of such a system includes the above-noted surface metrology sensor, as well as an electronic control unit (ECU) and a measurement tool. The surface metrology sensor is configured to measure a characteristic of a conditioned core surface of the metal component. The conditioned core surface is a portion of an exposed surface of the metal component subsequent to the exposed surface, with contiguous case and core surfaces, being uniformly subjected to physical surface conditioning process. The ECU is in communication with the surface metrology sensor and is configured to identify a case-core boundary of the exposed surface using the measured characteristic. The case-core boundary includes a location at which a predetermined difference or gradient in the measured characteristic is present on the exposed surface. The measurement tool, which is likewise in communication with the ECU, is configured to measure the effective case depth as a perpendicular distance between the reference surface of the case and the case-core boundary.

A method according to another embodiment may be used for determining an effective case depth of a carburized steel component having a case and a core. The case hardness level is greater than about 50 HRC. The core hardness level is less than about 48 HRC. The method includes forming a conditioned core surface, including uniformly blasting or shot peening an exposed surface of the metal component with blast media having a media hardness level in a range of about 50 HRC to 52 HRC. The exposed surface of the metal component is a contiguous surface of the case and the core. The method also includes measuring a surface texture of the conditioned core surface using a profilometer, and then identifying a case-core boundary using the surface texture, including identifying a location at which a predetermined difference or gradient in the surface texture is present across the exposed surface, the predetermined difference or gradient being indicative of the case-core boundary.

Additionally, the method in this embodiment includes measuring the effective case depth as a perpendicular distance between a reference surface of the case and the case-core boundary. Forming the conditioned core surface includes blasting or shot peening the exposed surface of the carburized component with the blast media or shot at about 40 psig for a coverage rate of about 200%.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa, e.g., "a" means "at least one" or "one or more"; the words "and" and "or" shall be both conjunctive and disjunctive; the words "any" and "all" shall both mean "any and all"; and the words "including", "containing", "comprising", "having", and the like shall each mean "including without limitation". Moreover, words of approximation such as "about", "almost", "substantially", "approximate", "approximately", "generally", and the like may be used herein in the sense of "at, near, or nearly at", "within 0-5% of", "within acceptable manufacturing tolerances", or any logical combination thereof.

Figure 1:
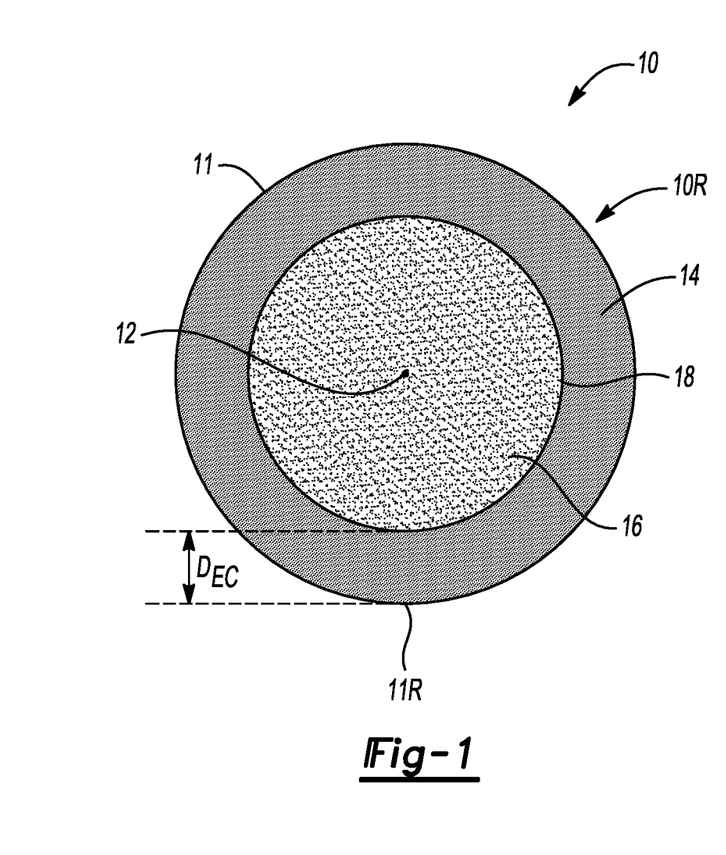
FIG. 1 is a schematic illustration of a representative metal component having a relatively hard layer or case whose effective depth is measurable using the present methodology.

Referring to the drawings, wherein like reference numbers refer to like features throughout the several views, a simplified embodiment of a metal component 10 is depicted schematically in FIG. 1. For illustrative simplicity, the metal component 10 is shown as an axial end view of a non-limiting exemplary rotary shaft 10R having an outer diameter surface 11 and a longitudinal center axis 12. However, the present teachings are extendable to a myriad of other embodiments of the metal component 10, e.g., gear elements, panels, beams, turbine blades, etc., and therefore the simplified embodiment of FIG. 1 is intended to be illustrative and non-limiting.

The metal component 10 according to the present disclosure includes one or more layers of a relatively hard metal material, with such layers collectively referred to hereinafter as a case 14, and one or more additional layers of relatively soft metal material collectively referred to hereinafter as the core 16. While the case 14 and the core 16 are both constructed of metal and thus "hard" in a nominal sense, the case 14, unlike the core 16, may be subjected to a hardening process or constructed via cladding of a harder metal. In either embodiment, the hardness level of the case 14 exceeds the hardness level of the core 16, as will be appreciated by those of ordinary skill in the art. Due to this case-core hardness differential, a case-core boundary 18 exists between the case 14 and the core 16. The perpendicular distance between the reference surface 11R of the case 14 and the case-core boundary 18 is referred to as the effective case depth ($D_{EC}$). In the various case-hardened examples provided herein, i.e., not including cladding or other alternative scenarios, hardness will decrease as a function of depth until it matches the core hardness.

In the illustrated example embodiment, the outer diameter surface 11 serves as the reference surface 11R. However, other embodiments may be envisioned having a complex external and/or internal surface geometry, and therefore the identity of the reference surface 11R will vary based on the application or end use. Likewise, while for simplicity and clarity the case 14 and core 16 are represented in FIG. 1 as distinct uniform areas separated from each other by the case-core boundary 18, the hardness level of the case 14 in an actual embodiment may gradually decrease until ultimately matching the hardness level of the core 16, as noted above. In such an embodiment, the case-core boundary 18 is a location somewhere below the surface 11 where hardness is equivalent to or falls below a specified threshold hardness level, e.g., from a blueprint of the metal component 10 or another calibrated component-specific/application-specific reference.

The effective case depth ($D_{EC}$) of a hardened metal component, e.g., the exemplary metal component 10 depicted in FIG. 1, may be rapidly determined using the present method 100, an exemplary embodiment of which is described below with reference to FIG. 2. As a fundamental aspect of the method 100, an exposed surface 20 of the metal component 10 is physically conditioned, such as by using a well-controlled media blasting or shot peening process. The particular media used for this preliminary process of physical surface conditioning should have a hardness level effectively matching that of the case-core boundary 18, i.e., to within a small allowable tolerance as set forth below.

Figure 3:
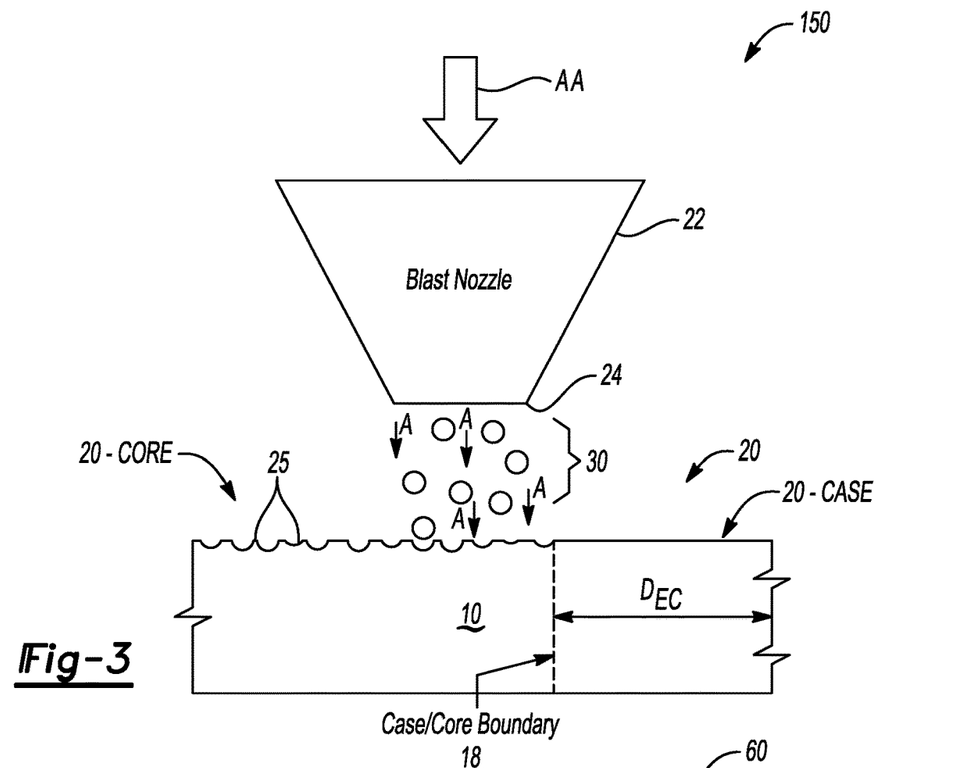
FIG. 3 is a schematic illustration of a blast media/shot peening process usable for physically conditioning one or more surfaces of a metal component as part of the method shown in FIG. 2.

By way of example and not of limitation, using a threshold hardness level of about 50 HRC on the Rockwell hardness C scale (HRC) and the core 16 having a core hardness level of less than about 48 HRC, the particular blast media or shot shown at 30 in FIG. 3 and used to physically surface condition the metal component 10 should have a hardness level of about 50 HRC, thus matching or equaling the threshold hardness level in this example. However, one could use blast media 30 having a slightly higher hardness level, such as about 102% to 105% of the hardness level of the case-core boundary 18 or about 51-52 HRC in an example implementation, with such a hardness level possibly revealing the case-core boundary 18 a bit more effectively than would be possible using blast media 30 having a hardness level that exactly matches the threshold boundary hardness level. In other words, the hardness level of the blast media 30 need not exactly match the threshold boundary hardness level within the scope of the disclosure, provided the blast media 30 exceeds the hardness level of the core 16 only by a margin sufficient for plastically deforming an exposed surface of the core 16 without also plastically deforming exposed surface of the case 14.

The exposed surface 20 of the metal component 10, which may be an external surface as shown in FIG. 1 or a cross-sectional surface in different embodiments, is thus physically conditioned such that a property of the core 16, e.g., its surface texture or internal stresses, are altered in a detectable manner. By selecting blast media 30 whose hardness level adequately matches that of the case-core boundary 18 or the threshold boundary hardness level as noted above, the core 16 is plastically deformed to a controlled degree without altering the surface of the case 14. The resulting disparity in surface texture, internal stress, or other characteristics of the case 14 and the core 16 is thus susceptible to automatic detection, quantification, and interpretation within the scope of the disclosure. In turn, such an approach enables the location of the case-core boundary 18 to be accurately ascertained and thereafter used to measure the effective case depth ($D_{EC}$).

Figure 2:
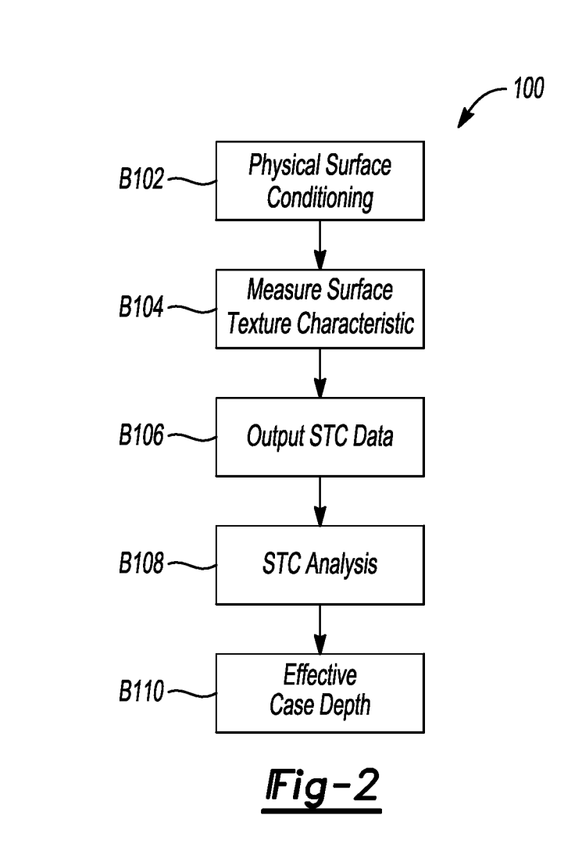
FIG. 2 is a schematic flow diagram depicting an exemplary method for determining the effective case depth of a metal component.

Referring to FIG. 2, an embodiment of the method 100 commences at block B102 ("Physical Surface Conditioning") with controlled surface conditioning of an exposed surface 20 (see FIG. 3) of the metal component 10. Block B102 may optionally include performing sample preparation steps. For instance, when it is desirable to measure the effective case depth ($D_{EC}$) at an internal surface of the metal component 10, block B102 may entail cutting the metal component 10, e.g., using a band saw or a laser cutting device, such that the exposed surface 20 is a cross-sectional area of the metal component 10. The case 14 and the core 16 may already be sufficiently exposed in other approaches, such as with the exposed end surface of FIG. 1, which would reduce or eliminate the need for cross-sectioning or cutting of the metal component 10.

Informing block B102, a set of baseline data may be determined that correlates a given surface texture characteristic or other characteristic of the metal component 10, after surface conditioning, with surface hardness. Such data is unique to particular materials whose effective case depth ($D_{EC}$) is ultimately determined using the method 100. A non-limiting example of such a hardness correlation is depicted in FIG. 5.

Figure 5:
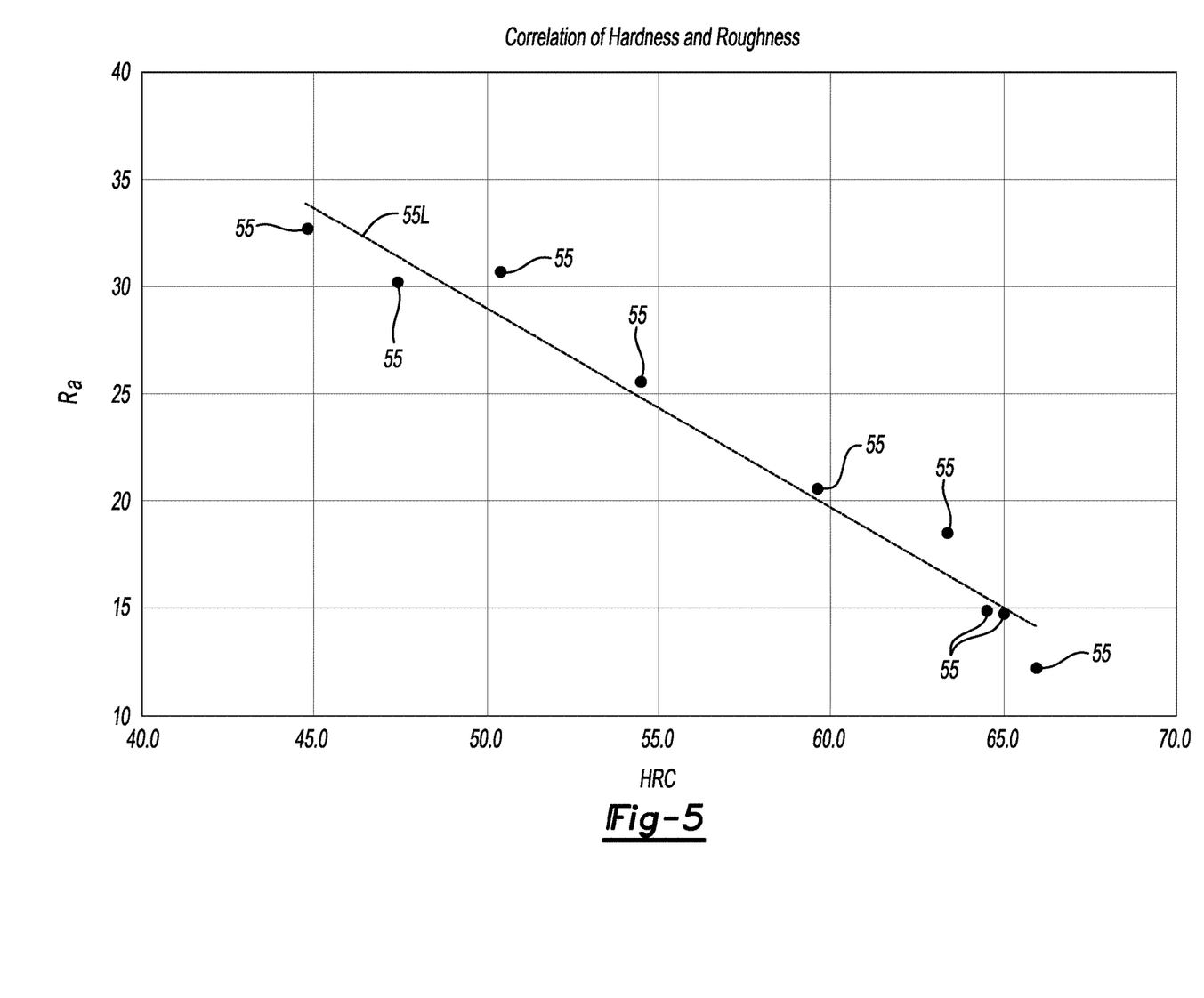
FIG. 5 is a representative plot of surface hardness versus surface roughness on the horizontal axis and the vertical axis, respectively.

Referring briefly to FIG. 5, hardness on the Rockwell C scale (HRC) is depicted on the horizontal axis. A non-limiting example characteristic is depicted on the vertical axis, in this instance a surface texture characteristic in the form of average surface roughness (Ra) shown in microinches, but possibly embodied as internal compressive residual stresses in another embodiment. As shown by a series of data points 55 and a line of best fit 55L, a correlation exists between surface roughness and hardness, with higher levels of surface roughness closely correlated with softer materials. Thus, unlike the softer materials of the core 16 shown schematically in FIG. 1, the harder materials of the case 14 should be highly resistant to plastic deformation during a carefully planned and executed media blasting process. Thus, the correlation of the type represented in FIG. 5 can be used as set forth herein to help set useful control parameters for performing block B102.

Referring briefly to FIG. 3, a simplified illustration is provided of a media blasting process 150 that may be used as part of block B102. The exposed surface 20 of the metal component 10 is positioned with respect to a blast nozzle 22. The blast nozzle 22 is fed from a compressor (not shown) with air pressure (arrow AA), and also with a supply of blast media 30, e.g., spherical and/or asymmetrical media, such that the blast media 30 is expelled under pressure from an end 24 of the blast nozzle 22, as indicated by arrows A. When the expelled blast media 30 strikes a portion of the exposed surface 20 having a surface hardness less than that of the incident blast media 30, the blast media 30 will plastically deform those portions of the exposed surface 20 corresponding to the softer core 16, and in this manner will form a conditioned core surface 20-CORE. Surface asperities 25 in the conditioned core surface 20-CORE will result, with such surface asperities 25 being collectively detectable across a wide area of the exposed surface 20 as surface texture, roughness, or another detectable characteristic such as subsurface/internal stresses.

At the same time, the blast media 30 due to its construction will not plastically deform portions of the exposed surface 20 corresponding to the harder case 14, i.e., a conditioned case surface 20-CASE as shown in FIG. 3. Thus, while the exposed surface 20 is uniformly conditioned in its entirety, the conditioned case surface 20-CASE is not affected, at least to a degree that is considered significant for the purposes of performing the present method 100. In other words, materials of construction having a known surface hardness will plastically deform in a detectable and quantifiable manner in response to sustained contact with harder blast media 30. The parameters used in performing block B102 of FIG. 2 are therefore selected and controlled to ensure such a result.

In order to ensure optimal repeatability and sufficient uniformity of plastic deformation of the core 16 of FIG. 1 across the exposed surface 20 of FIG. 3, and in particular of the material of the core 16, an application-specific set of surface conditioning control parameters is established for a given construction of the metal component 10. Such parameters may include any or all of a composition, shape, and hardness of the blast media 30, nozzle pressure at which such blast media 30 is expelled toward the exposed surface 20, the standoff distance between the nozzle end 24 and the exposed surface 20, coverage percentage, etc. As a given lot or supply of the blast media 30 may vary in hardness, size, and shape to at least some degree, the parameters used for selecting appropriate blast media 30 may be averages and/or maximum/minimum ranges.

By way of a representative example and not of limitation, the metal component 10 may be constructed of carburized steel, e.g., 9310 carburized steel, and the blast media 30 may be embodied as #13 glass beads having a hardness level of 48-52 HRC per AMS2431/6. In such an embodiment, a nozzle pressure of about 40-psig at a standoff distance of about six inches and a blast duration sufficient to ensure coverage of at least about 200% may be used to construct the conditioned core surface 20-CORE of FIG. 3. Since the entire exposed surface 20 is conditioned using the same media blasting conditions, but as only softer portions of the exposed surface 20 will plastically deform and/or have compressive stresses imparted thereto, it should be noted that the case 14 is likewise exposed without such exposure having a discernable deformation effect.

As will be appreciated by those of ordinary skill in the art, "coverage" or "coverage rate" refers to the percentage of surface area impacted by shot-induced indentations, dents, or divots, with higher coverage rates ultimately resulting in uniform denting or dimpling of a surface produced. 100% coverage is defined as uniform denting of a surface in its entirety when viewed with the unaided eye, i.e., without device-assisted magnification. When viewed under magnification (e.g., up to 30×), individual un-peened islands are permitted, provided that such islands are randomly distributed, and that the width of any single un-peened island is less than the typical indentation diameter. Coverage of more than 100% is defined in terms of multiples of the 100% exposure time of the shot blast, and thus the representative 200% of the present non-limiting example requires media blasting/shot peening for twice the time required to achieve full coverage. An approximately perpendicular blast angle, e.g., 80-100 degrees, may be used in this particular embodiment. Those of ordinary skill in the art will appreciate that the defined parameters used in block B102 will vary with other embodiments, and therefore the forgoing example is just one possible approach for implementing the method 100.

Figure 4:
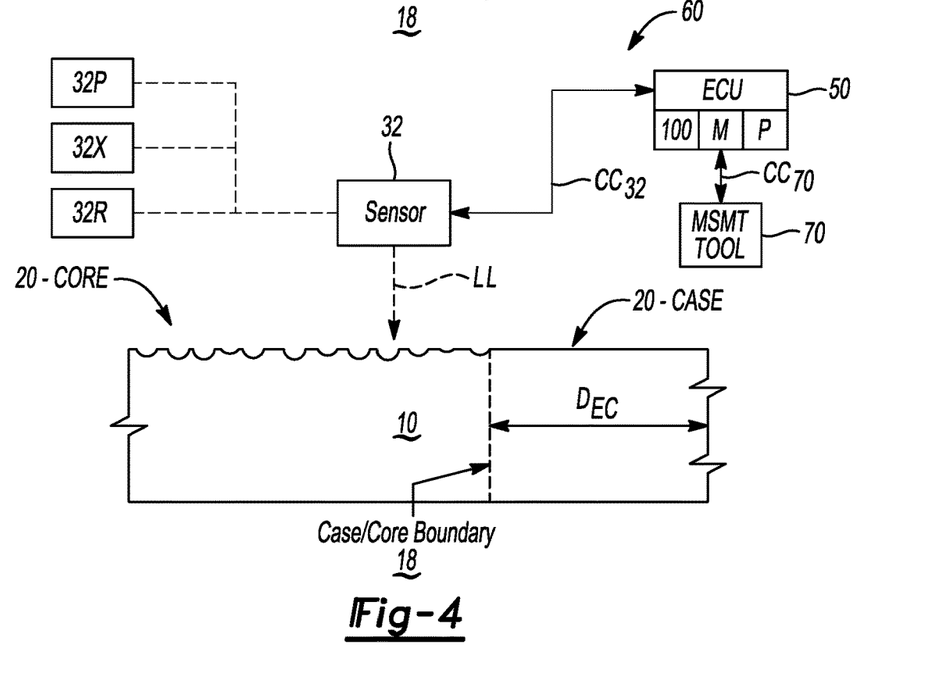
FIG. 4 is a schematic illustration of a system for measuring surface texture and effective case depth as part of the present method.

Referring to FIGS. 2 and 4, the method 100 proceeds to block B104 once the exposed surface 20 has been physically conditioned. Block B104 of FIG. 2 ("Measure Surface Texture Characteristic") includes measuring one or more surface texture characteristics or other characteristics of the conditioned core surface 20-CORE, e.g., using a surface metrology sensor 32 as depicted schematically in FIG. 4. The surface texture characteristic in some embodiments may include a surface roughness of the conditioned core surface 20-CORE. In such an embodiment, the surface metrology sensor 32 may be embodied as a profilometer 32P. As will be appreciated by those of ordinary skill in the art, a profilometer 32P is an instrument for measuring surface asperities as a way of determining surface roughness. A stylus or other contact gauge may be used in some embodiments to measure the surface roughness.

In other embodiments, block B104 may be implemented using a non-contact profilometer, e.g., a laser profilometer, a scanning interferometer, an optical surface profiler, a 3D optical microscope, and/or other application-suitable non-contact profilometers emitting a beam LL in an applicable wavelength or range of electromagnetic energy toward the conditioned core surface 20-CORE. In yet another embodiment, the surface metrology sensor 32 of FIG. 4 may also be embodied as a reflectometer 32R, e.g., radar, lidar, particle beam, ultrasound, or other incident electromagnetic energy beam. In such an embodiment, the surface texture characteristic includes a level of reflectivity of the conditioned core surface 20-CORE. The method 100 proceeds to block B106 of FIG. 2 once measurement of the surface texture characteristic or other characteristic is complete.

As noted above, other types of surface metrology sensors 32 may be used as possible alternatives to the contact and non-contact profilometers 32P, with characteristics other than surface texture used to detect the case-core boundary 18. For example, an X-ray diffractometer 32X may be used to measure internal compressive stresses using X-ray diffraction from the conditioned core surface 20-CORE when such a surface 20-CORE is irradiated by an incident X-ray beam or a neutron beam embodiment of beam LL. As will be appreciated, X-ray diffraction may be used to measure lattice spacing at the atomic level, and thus may have benefit when applied to the present problem of quantifying a measurable characteristic of the conditioned core surface 20-CORE. Such an approach looks to internal compression of the subsurface microstructure rather than surface roughness to a similar end effect.

At block B106 of FIG. 2, the method 100 includes outputting and/or recording the measured surface texture characteristic ("Output STC Data") or another measured characteristic as a data file. Such a data file may be variously embodied as digital output signal and/or a physical file, e.g., a printout or displayed result. The method 100 proceeds to block B108 once the STC data has been generated and recorded.

Block B108 includes analyzing the data file from block B106, e.g., the surface texture characteristic data ("STC Analysis") or other characteristic data, to thereby locate the case-core boundary 18 (see FIG. 1). Block B108 may include identifying a location at which a threshold difference or gradient in the surface texture characteristic or other characteristic used in a given embodiment exists across the contiguous area of the now-conditioned case 14 and core 16, with such a threshold difference being indicative of the presence of the case-core boundary 18. As the physical surface conditioning process conducted at block B102 is configured to not alter or plastically deform the exposed case surface 20-CASE (see FIG. 3), the location of the case-core boundary 18 is readily identifiable by detecting a transition from a plastically deformed surface area (or compressive stresses) indicative of the softer core 16 to an undisturbed or relatively undisturbed surface indicative of the harder case 14. Once coordinates of the case-core boundary 18 are known, e.g., using calipers, gauges, or optical measurement tools, the method 100 proceeds to block B110.

Block B110 ("Effective Case Depth") includes measuring the effective case depth ($D_{EC}$) as a linear perpendicular distance between the case-core boundary 18 and the reference surface 11R of the case 14. In the embodiment of FIG. 1, for instance, the effective case depth ($D_{EC}$) may be measured as a perpendicular distance between the outer diameter surface 11 of the case 14 and the case-core boundary 18, such as by using similar gauges, calipers, or optical measurement tools as used in block B108. The effective case depth ($D_{EC}$), once measured, may be used in a myriad of automated or manual processes, including but not limited to quality assurance and/or end-of-line quality inspection processes.

By way of example, the metal component 10 whose effective case depth ($D_{EC}$) is determined according to the method 100 may itself be representative of a particular build quantity or lot. As an illustration, a manufacturer of a case-hardened pinion gear may select a sample pinion gear from a lot, perform the method 100 on the sample pinion gear to derive its effective case depth ($D_{EC}$), and thereafter compare the measured effective case depth ($D_{EC}$) to a threshold effective case depth, e.g., from a component— and/or application-specific blueprint, table, chart, or other calibrated reference or requirement, with an example of such a threshold effective case depth being about 2 mm. A quality assurance action or other control action may then be taken with respect to the build quantity or lot whenever the effective case depth ($D_{EC}$) is less than the threshold case depth. In this particular illustrative example, an appropriate action taken in response to the effective case depth ($D_{EC}$) being less than 2 mm may range from testing additional sample pinions to rejecting the build quantity or lot.

As shown schematically in FIG. 4 and as appreciated by those of ordinary skill in the art, various blocks of method 100 may be performed automatically by and/or with the assistance of a host computer device or electronic control unit (ECU) 50 equipped with requisite hardware and software associated with the described blocks. That is, a system 60 for determining the effective case depth ($D_{EC}$) of the metal component 10 may include the surface metrology sensor 32 in any or all of the above-disclosed embodiments, including but not limited to the profilometer 32P, the X-ray diffractometer 32X, and/or the reflectometer 32R, and one or more ECUs 50 configured to identify the case-core boundary 18 using the surface texture characteristic(s) noted above. The system 60 may also include a contact or optical/non-contact measurement tool ("MSMT TOOL") 70 configured for measuring the effective case depth ($D_{EC}$) exemplified in FIG. 1 as the linear perpendicular distance between the reference surface 11R of the case 14 and the case-core boundary 18.

The ECU 50 of FIG. 4 may encompass a single standalone or multiple networked physical computer devices each having one or more processors (P) and associated non-transitory memory (M), i.e., read only memory, programmable read only memory, random access memory, optical or magnetic memory, etc. The non-transitory memory contemplated herein may be used to software and/or firmware programs, as well as to host input/output circuits and devices for interfacing with peripheral equipment inclusive of the surface metrology sensor and non-contact/optical embodiments of the case depth measurement device. Such an ECU 50 may also include requisite signal conditioning and buffer circuitry as well as other hardware components that can be accessed to provide a described functionality of the present method 100. Electronic control signals (arrows $CC_{32}$ and $CC_{70}$) may be transmitted to and from the metrology sensor(s) 32 and the measurement tool 70, respectively, as part of the method 100.

Attendant benefits of the disclosed method 100 and possible hardware implementations thereof will be readily appreciated by those of ordinary skill in the art. For instance, the present teachings are intended to vastly simplify and expedite sample preparation and to reduce person-to-person or machine-to-machine test variability commonly associated with indentation-based micro-hardness traverse testing systems. Moreover, the uniform surface conditioning of the entirety of the exposed surface, which does not equally affect the surface texture of different conditioned materials as noted herein, ensures that more of the case can be evaluated relative to existing methods, with a corresponding reduction in consumables needed to evaluate the effective case depth ($D_{EC}$) and less time needed to collect case depth data. Conventional macro-hardness and micro-hardness testing processes rely on precise size/depth measurements of an indent at a large number of discrete locations, and therefore rely on greater plastic deformation of softer materials relative to harder materials. By extension as enabled by the present disclosure, the uniform surface conditioning of the exposed surface 20 causes wider area plastic deformation of the core 16 to enable surface texture or another suitable characteristic such as subsurface stresses to be used across a wide area with the above attendant benefits. These and other benefits will be readily appreciated by those of ordinary skill in the art in view of the forgoing disclosure.

Aspects of the present disclosure have been described in detail with reference to the illustrated embodiments. Those skilled in the art will recognize, however, that certain modifications may be made to the disclosed structure and/or methods without departing from the scope of the present disclosure. The disclosure is also not limited to the precise construction and compositions disclosed herein. Modifications apparent from the foregoing descriptions are within the scope of the disclosure as defined by the appended claims. Moreover, the present concepts expressly include combinations and sub-combinations of the preceding elements and features.

What is claimed is:

1. A method for determining an effective case depth of a metal component having a relatively hard layer or case and a relatively soft layer or core, the method comprising:
   physically conditioning an exposed surface of the metal component to thereby form a conditioned surface, including subjecting a contiguous area of the case and the core to a physical surface conditioning process;
   measuring a characteristic of the conditioned surface as a measured characteristic using a surface metrology sensor;
   locating a case-core boundary using the measured characteristic, including identifying a location at which a predetermined difference or gradient in the measured characteristic indicative of the case-core boundary is present on the conditioned surface;
   determining the effective case depth as a measured depth, including measuring a perpendicular distance between a reference surface of the case and the case-core boundary; and
   wherein physically conditioning the exposed surface of the metal component includes blasting or shot peening the exposed surface using blast media, wherein the blast media has a hardness level sufficient for plastically deforming the exposed surface of the metal component of the core without plastically deforming the exposed surface of the metal component of the case.

2. The method of claim 1, wherein the metal component is constructed of carburized steel, the hardness level of the blast media is in a range of 48 HRC to 52 HRC, and physically conditioning the exposed surface of the metal component includes blasting or shot peening the exposed surface of the metal component from a standoff distance of about 6 inches, at a pressure of about 40 psig, and with a coverage level of about 200 percent.

3. The method of claim 1, wherein the measured characteristic includes a measured surface texture or roughness, and wherein the surface metrology sensor includes a profilometer.

4. The method of claim 3, wherein the profilometer includes a non-contact profilometer.

5. The method of claim 4, wherein the non-contact profilometer includes a laser profilometer or a scanning interferometer.

6. The method of claim 4, wherein the non-contact profilometer includes a reflectometer.

7. The method of claim 1, wherein the surface metrology sensor includes an X-ray diffractometer, and wherein the characteristic is a level of internal compressive stresses of the metal component.

8. The method of claim 1, wherein the metal component is representative of a build quantity or lot, the method further comprising:
   comparing the measured depth to a predetermined threshold depth; and
   automatically executing a quality assurance or control action with respect to the build quantity or lot when the measured depth is less than the predetermined threshold depth.

9. The method of claim 1, further comprising:
   cutting the metal component to thereby form the exposed surface of the metal component, such that the exposed surface is a cross-sectional area of the metal component.

10. A system for determining an effective case depth of a metal component having a relatively hard layer or case that includes a reference surface, and a relatively soft layer or core, the system comprising:
- a surface metrology sensor configured to measure a characteristic of a conditioned core surface of the metal component as a measured characteristic, wherein the conditioned core surface is a portion of an exposed surface of the metal component subsequent to the exposed surface being uniformly subjected to a physical surface conditioning process in which the exposed surface of the metal component is blast or shot peened using blast media, wherein the blast media has a hardness level sufficient for plastically deforming the exposed surface of the metal component of the core without plastically deforming the exposed surface of the metal component of the case;
- an electronic control unit (ECU) in communication with the surface metrology sensor and configured to identify a case-core boundary of the exposed surface using the measured characteristic, wherein the case-core boundary includes a location at which a predetermined difference or gradient in the measured characteristic is present on the exposed surface to indicate a transition between the case and the core; and
- a measurement tool in communication with the ECU, wherein the measurement tool is configured to measure the effective case depth as a perpendicular distance between the reference surface of the case and the case-core boundary.

11. The system of claim 10, wherein the measured characteristic includes a surface roughness or texture of the conditioned core surface, and wherein the surface metrology sensor is a profilometer.

12. The system of claim 11, wherein the profilometer is a non-contact profilometer.

13. The system of claim 12, wherein the non-contact profilometer is a laser profilometer or a scanning interferometer.

14. The system of claim 12, wherein the non-contact profilometer is a reflectometer, and wherein the surface roughness or texture includes a level of reflectivity of the conditioned core surface.

15. The system of claim 10, wherein the surface metrology sensor is an X-ray diffractometer, and wherein the measured characteristic includes a measured level of internal compressive stresses.

16. A method for determining an effective case depth of a carburized steel component having a case and a core, wherein a case hardness level of the case is greater than 50 HRC and a core hardness level of the core is less than 48 HRC, the method comprising:
- forming a conditioned core surface, including uniformly blasting or shot peening an exposed surface of the carburized steel component with blast media having a media hardness level in a range of about 50 HRC to 52 HRC, wherein the exposed surface of the carburized steel component is a contiguous surface of the case and the core;
- measuring a surface texture of the conditioned core surface using a profilometer; identifying a case-core boundary using the surface texture, including identifying a location at which a predetermined difference or gradient in the surface texture is present across the exposed surface, the predetermined difference or gradient being indicative of the case-core boundary; and
- measuring the effective case depth as measured depth, wherein the measured depth is a perpendicular distance between a reference surface of the case and the case-core boundary;
- wherein forming the conditioned core surface includes blasting or shot peening the exposed surface of the carburized steel component with the blast media at about 40 psig for a coverage rate of about 200 percent.

17. The method of claim 16, wherein the profilometer is a non-contact laser profilometer or a scanning interferometer.

18. The method of claim 16, wherein the carburized steel component is representative of a build quantity or lot, the method further comprising:
- comparing the measured depth to a predetermined threshold depth; and
- automatically executing a quality assurance or control action with respect to the build quantity or lot when the measured depth is less than the predetermined threshold depth.

19. The method of claim 16, further comprising:
- cutting the carburized steel component to thereby form the exposed surface, such that the exposed surface is a cross-sectional area of the carburized steel component.

20. The method of claim 1, wherein the case-core boundary has a hardness level and the hardness level of the blast media adequately matches the hardness level of the case-core boundary.

* * * * *